Figure 1:
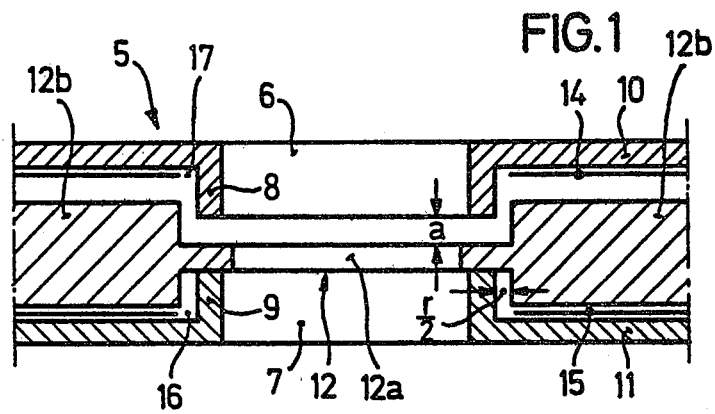

United States Patent [19]

Fitterer et al.

[11] 4,438,892

[45] Mar. 27, 1984

[54] TAPE CASSETTE, ESPECIALLY A MAGNETIC TAPE CASSETTE

[75] Inventors: Horst Fitterer, Mannheim; Hubert Koob, Willstaett; Bert Nestler, Seelbach, all of Fed. Rep. of Germany

[73] Assignee: BASF Aktiengesellschaft, Ludwigshafen, Fed. Rep. of Germany

[21] Appl. No.: 341,885

[22] Filed: Jan. 22, 1982

[30] Foreign Application Priority Data

Jan. 22, 1981 [DE] Fed. Rep. of Germany ... 8101456[U]

[51] Int. Cl.³ .................... G03B 1/04; G11B 15/32
[52] U.S. Cl. .................................. 242/199; 360/132
[58] Field of Search .............. 242/192, 197–200; 360/130.33, 132, 96.1, 93; 352/72, 78 R

[56] References Cited

U.S. PATENT DOCUMENTS

| | | | |
|---|---|---|---|
| 3,712,559 | 1/1973 | Schwartz | 242/199 |
| 3,826,489 | 7/1974 | Watkins, Jr. | 360/132 |
| 3,891,159 | 6/1975 | Nelson | 242/199 |
| 3,923,272 | 12/1975 | Pertsch et al. | 242/199 |
| 3,942,744 | 3/1976 | Fitterer et al. | 242/199 |
| 3,977,626 | 8/1976 | Gaiser et al. | 242/199 |
| 4,368,497 | 1/1983 | Shirako | 360/132 |

FOREIGN PATENT DOCUMENTS 2251746 10/1972 Fed. Rep. of Germany .
2327828 6/1973 Fed. Rep. of Germany .
7330078 8/1973 Fed. Rep. of Germany .

*Primary Examiner*—Leonard D. Christian
*Attorney, Agent, or Firm*—Keil & Witherspoon

[57] ABSTRACT

In a magnetic tape cassette, especially a compact cassette, at least one hole in the conventional liners is provided, according to the invention, with at least one raised edge portion which is located between the aperture in the housing wall for admitting the drive spindle and the inner wall of the hub, and serves as a resilient support for the hub.

9 Claims, 15 Drawing Figures

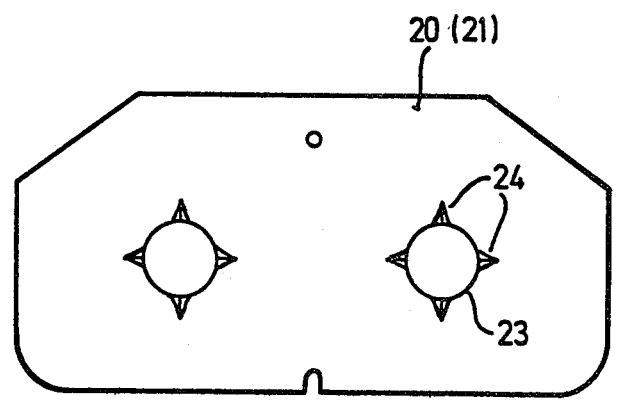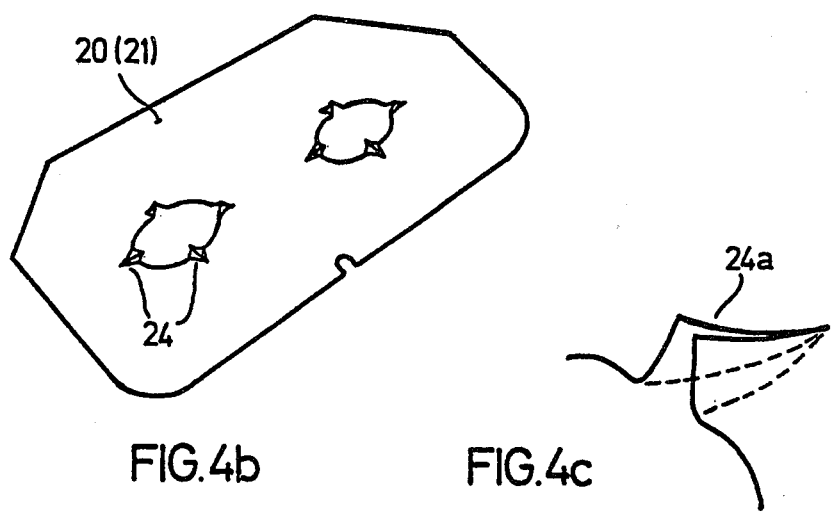
FIG.4a  FIG.4d
FIG.4b  FIG.4c

TAPE CASSETTE, ESPECIALLY A MAGNETIC TAPE CASSETTE

The invention relates to a tape cassette, especially a magnetic tape cassette, which contains at least one tape roll wound on a hub which is rotatably mounted on a wall of the housing or on a collar on the housing, an aperture which allows a drive spindle to enter the cassette being arranged concentrically with respect to the hub, and also contains at least one liner with a hole to allow the drive spindle to pass therethrough, the liner being located between the hub and the housing through, the liner being located between the hub and the housing wall.

In the compact cassette system, compatibility between the cassette and the recorder or, rather, its drive spindles, is achieved by arranging for the hubs to have play relative to the housing, in both the radial and axial directions. DIN No. 45,516 provides for the following tolerances:

Play in the radial direction min: 1 mm, max: 1.9 mm
Play in the axial direction max: 1.3 mm It is possible, during operation and/or handling of the cassettes, for the following shortcomings to arise, in particular as a result of the radial play between the hub and the cassette housing:

During fast rewinding, the hubs—particularly on the supply side—knock against the housing and/or the collars on the housing, and cause a distinctly audible rattling noise. When the cassette is operated vertically in the recorder, the hub on the supply side rotates so jerkily on the collar of the housing that rapid changes in tape tension occur, which, in turn, lead to variations in pitch. When the cassette is handled outside the recorder, the hubs can knock against the housing and produce rattling noises.

German Laid-Open Application DOS No. 2,327,828 discloses use of liners in magnetic tape cassettes, which are provided with cut-outs in the region of the holes for the drive spindles, so that spring forces are exerted on the hub by the extensions which remain. Only axial spring loading of the hub is achieved by this means, so that the hub is only held in the central plane of the cassette. However, in order to obtain this effect, it is necessary to provide an annular depression around the bearing collar on the cassette housing, and to also provide the hub itself with an annular collar, so that this collar can bear against the liner extensions in the annular depression. In the mass production of cassettes, modifications of this nature, both to cassettes and hubs, necessitate expensive tool modifications, so that hub-bearing problems require a less complicated solution.

German Utility Model No. 7,221,230 has disclosed circular liners with embossed projections which are located concentrically with respect to the axes of rotation of the hubs and bear against the upper and lower surfaces of the hubs, holding them approximately in the central plane between the cassette walls. This design is capable neither of providing a bearing action between the hub and the entry aperture or the collar on the housing, nor of fixing the position of the hub in the radial direction. In principle, the above statements also apply in the case of liners having a normal outline and, for example, circular embossed projections for two hubs (see German Utility Model No. 7,330,078 (U.S. Pat. No. 3,977,626)).

German Published Application DAS 2,251,746 (U.S. Pat. No. 3,942,744) discloses liners with edge zones which are bent down towards the central plane of the cassette, these zones being intended to guide the tape roll at its periphery and to guide the unwinding tape. However, these liners are completely flat in the region of the holes in the liners.

It is an object of the present invention to restrict the mobility of the hubs in cassettes by simple means, and to improve their guidance and support. It is a further object to prevent, as far as possible, folding-over of the tape and seizing of the tape roll.

We have found that this object is achieved, according to the invention, with a tape cassette, especially a magnetic tape cassette, comprising a housing, at least one hub rotatably located within the housing, a roll of tape wound on the said one hub having at least one central recess, at least one aperture in the housing which allows a drive spindle to enter the cassette to drivably engage the said one hub, and at least one liner located between the said one hub and the housing and provided with a hole therein to allow the drive spindle to pass through the said one liner to engage the said one hub, wherein adjacent to the hole in the said one liner, the said one liner is provided with at least one raised bearing portion which projects into the said central recess in the said one hub and thereby resiliently supports the said one hub radially and axially, preventing it from making contact with the region of the housing surrounding the said aperture.

If a housing collar is present which projects into the hub from the housing wall, the bearing portions of the liner are advantageously located between the collar on the housing and the inner wall of the hub. In order to increase the spring force, and to reduce the radial play, it is also possible for the bearing portions of the liners to bear against the collar.

This design enables, first of all, the radial play of the hub to be limited, thus bringing about an advantageous centering of the hub with respect to the entry aperture for the winding spindle. At the same time, a bearing and biassing action can be produced between the entry aperture or the collar of the housing and the hub, which has a beneficial influence on the rotation of the latter.

In practical terms, the bearing portions around the hole in the liner are able to exert radial and axial spring forces on the hub, and thus on the tape roll, without any modification of the shape of the cassette housing, or of the hub.

In a practical design, bent-up tabs, cut out and symmetrically arranged, serve to improve the guidance and support of the hub or hubs. In this regard, the number of tabs is of secondary importance, provided that more than two tabs are used and they are symmetrically arranged with respect to the center of the hole in the liner.

In a further practical embodiment, the edge of the hole in the liner can be provided with ridge-like or bead-like embossed projections. Providing the embossed projections with a roof-like shape and cutting them open along the roof ridge to obtain a double spring force is regarded as another advantageous feature.

In the case of a completely or partially annular design of the bearing portions, it can also be advantageous, in practice, to provide the edge of the hole in the liner with a raised bead.

The designs claimed are easy to manufacture using heat, and are accordingly very suitable for the mass production of cassettes.

The location, according to the invention, of the bearing portions between the collar of the housing and the hub, in conjuction with the practical designs of the raised bearing portions has the additional advantage that the frictional forces which occur are shifted towards the axis of rotation, thus bringing about a reduction in the frictional torque.

It is also regarded as advantageous for the liners to have a low coefficient of friction relative to the hub, at least in the region of the raised bearing portions. This enables the frictional torque of the cassette to be reduced and hende the torque which the recorder has to generate, to be minimized.

To sum up, the advantages of smaller variations in pitch, reduced noise generation, and a reduction in the driving torque required of the recorder can be achieved with cassettes with the above inventive features.

It is also regarded as particularly advantageous if the liner possesses at least one outer edge portion which is bent up towards the central plane of the cassette, extending from a fold in the liner, and bears at least intermittently on the peripheral edge(s) of the tape roll(s).

In addition to improving the centering, these bent-up edge portions very advantageously prevent the tape from folding over and/or improve the winding and unwinding of the tape, which, in turn, avoids seizing of the tape roll against the housing.

In this design, the tape roll is thus resiliently gripped, over at least some portions of its outer periphery, and the hub is resiliently supported at its inner periphery, as a result of which a significant improvement in the running behavior of both the tape and the tape roll can be achieved as compared with the state of the art where only unstable conditions are obtained by beadshaped embossed projections pressing on the hubs.

Although the text which follows is essentially concerned with the description of compact cassettes, the present invention can be used for any type of tape cassette having one or more tape spools or tape rolls, irrespective of the purpose for which the tape cassette is used, whether for storing audio signals, video signals or data signals.

Figure 2A:
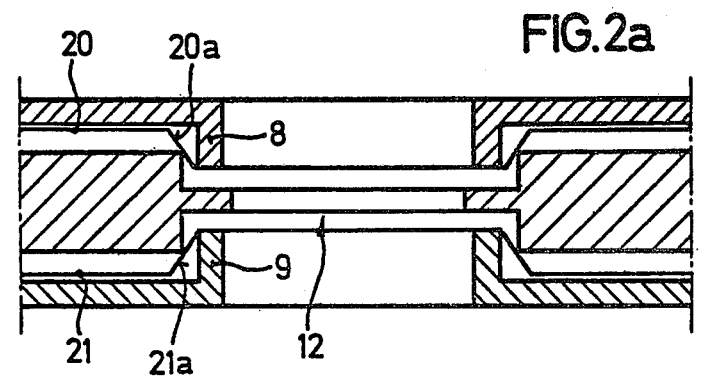
Figure 2B:
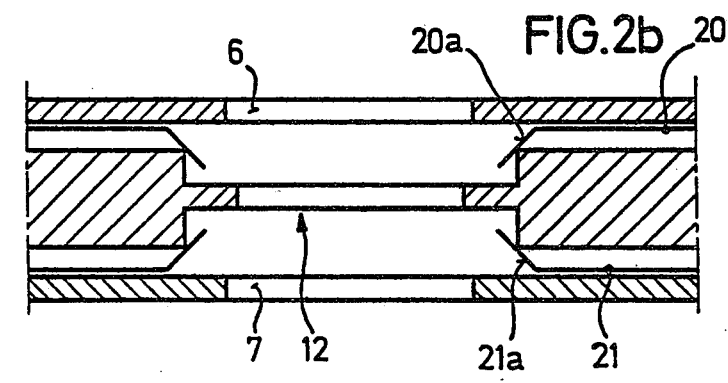
Figures 3A, 3D:
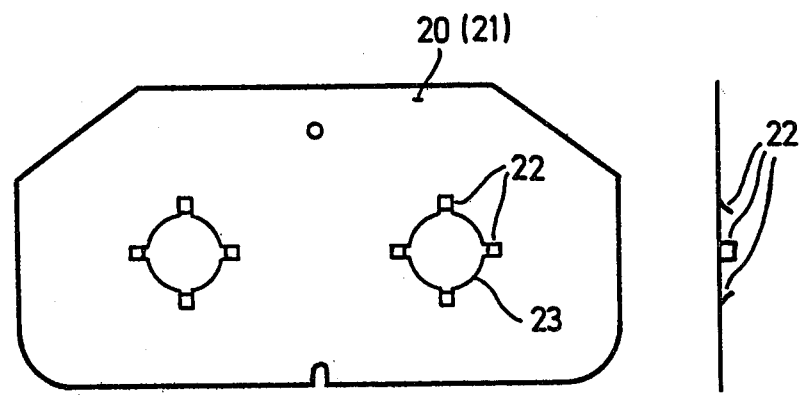
Figures 3B, 3C:
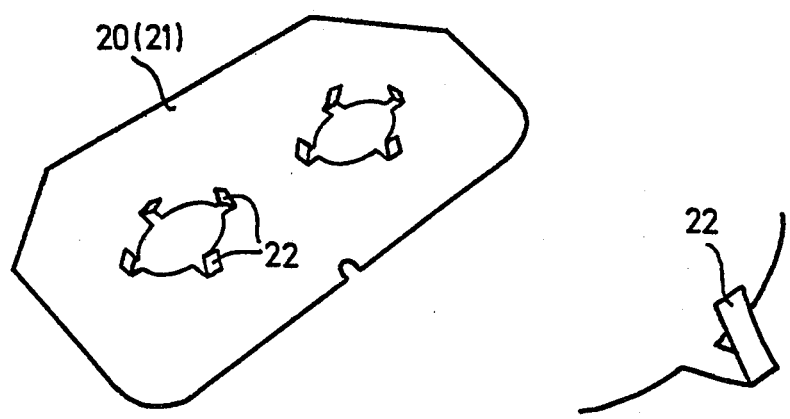
Figures 5A, 5C:
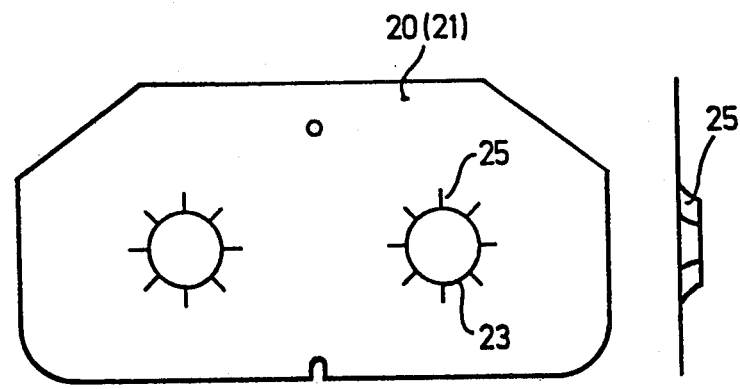
Figure 5B:
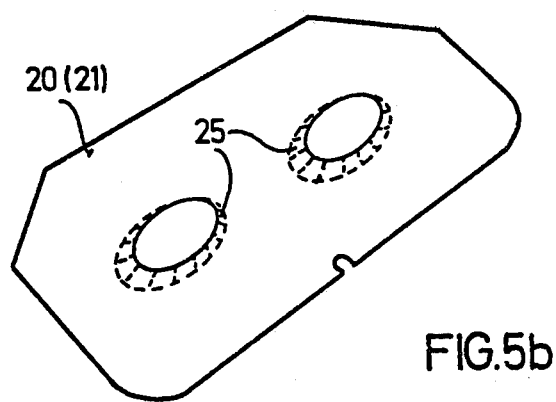
Figure 5D:
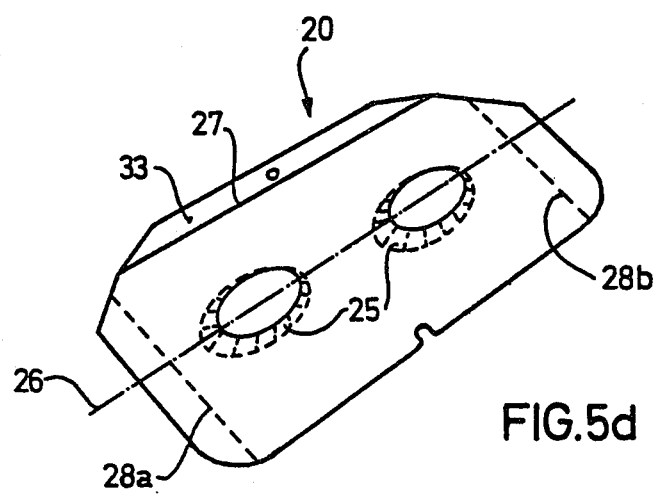

Further details of the invention are disclosed in the following description of various embodiments thereof illustrated in the accompanying drawings, in which FIG. 1 represents a partial section through a conventional compact cassette, with a hub and flat liners, FIG. 2a represents a section through a cassette according to the present invention, with modified liners, FIG. 2b represents a section through a cassette according to FIG. 2a, but without housing collars, FIG. 3a represents a plan view of a liner, with tabs, FIG. 3b represents a perspective view of the liner shown in FIG. 3a, FIG. 3c represents an individual tab, according to FIGS. 3a and 3b, FIG. 3d represents a side view of the liner according to FIGS. 3a to 3c, FIG. 4a represents a plan view of a liner with localised projections, FIG. 4b represents a perspective view of the liner shown in FIG. 4a, FIG. 4c represents a roof-shaped projection which has been cut open, FIG. 4d represents a side view of the liner according to FIGS. 4a and 4b, FIG. 5a represents a plan view of a liner with a raised annular peripheral bead, FIG. 5b represents a perspective view of the liner shown in FIG. 5a, FIG. 5c represents a side view of the liner according to FIGS. 5a and 5b, and FIG. 5d represents a liner according to FIG. 5b, but with edge portions bent up to guide the tape.

The partial section through the conventional compact cassette 5 shown in FIG. 1 passes through the center of the mutually opposite entry apertures 6 and 7, which are bounded on the inside by annular collars 8 and 9. The upper and lower walls of the housing are marked 10 and 11 respectively. The central portion 12a of the hub 12 is located between the annular collars 8 and 9, and portions of the ring member 12b can be seen on the right and on the left of the annular collars 8 and 9. Flat liners 14 and 15 are respectively located between the ring member 12b and the upper wall 10 of the housing, and between the ring member 12b and the lower wall 11 of the housing.

Holes 16 and 17 in the liners are markedly larger than the outer periphery of the collars 8 and 9, thus allowing easy insertion of the liners during assembly of the cassette 5.

Apart from the liners, the cassette shown in FIG. 1 corresponds to the cassette in FIG. 2, the individual parts accordingly bearing the same reference numbers.

The liners 20 and 21 shown in FIG. 2a are designed with edge portions 20a and 21a which are bent up and act as bearing surfaces for the hub 12. The maximum tolerances governing the play, as specified in the introduction, are represented in FIGS. 1 and 2, which show the correct relationship between the axial play a and the radial play r. It is clear that the inner portion of each of the edge portions 20a and 21a has a diameter which almost corresponds to the outer diameter of the collars 8 and 9, so that, as shown, contact with the collar occurs and the edge portions 20a and 21a come into location between the collars 8 and 9 respectively and the ring member 12b. As a result of the edge portions 20a and 21a being inclined, the ring member 12b is supported by these edge portions in both the radial and axial directions. However, support of the liners 20, 21 on the collars 8 and 9 is unnecessary, as shown in FIG. 2b, in which the housing collars are omitted.

As a result of this design, direct contact is avoided between the ring member 12b and the collar 8 or 9, and also between the tape roll and the inner walls of the cassette, and the hub 12 is held in about the mid-position of the space inside the cassette, as can be seen from FIG. 2. Additional practical designs of the liners 20 and 21 described previously are shown in FIGS. 3 to 6. Pairs of opposed, roughly rectangular tabs 22 are cut from the periphery of holes 23 and are bent up, as shown in FIG. 3. It is also possible, of course, to provide 3 or more than 4 tabs 22, provided that they are arrannged symmetrically with respect to the center of the holes. It is also possible to select a length for the tabs 22 such that they do not bear against the housing collar (see FIG. 2b), but damp the movement of the hub solely by means of the spring force predetermined by their shape and material.

FIG. 4 likewise shows liners 20 and 21, localized projections 24 being provided at the periphery of the holes 23. These projections can, for example, be roof-shaped, or of another suitable shape. A cut-open roof-shaped projection is shown in FIG. 4c.

FIG. 5 shows the liners 20 and 21, each with a raised bead 25 on the edge of each of the holes 23.

FIG. 5d shows one of the liners 20 or 21, with inclined edge portions.

The tabs, projections, raised beads and inclined edge portions can easily be produced by thermoforming.

Any suitable thin sheet material known for such applications can be used for the liners, such as polyester sheeting, polyvinyl chloride sheeting, polyterephthalate sheeting, etc. If required, each liner can be coated, either completely, or partially in the edge zones of the holes, with a substance which reduces the coefficient of frictions, such as graphite, molybdenum sulfide or silicone oil.

Comparative measurements, carred out under conditions encountered in practise, showed that cassettes according to the invention were capable of reducing the torque required for turning the hubs by 10 to 20%. Moreover, it was found that rattling no longer occurred as the result of the ring member knocking against the housing, especially during fast rewinding. Variations in tape tension, which are measurable as variations in pitch and usually occur during the playback operation as a result of irregular rotation of the supply hub on the collar of the housing, were likewise reduced by about 10%.

The observed reductions in the frictional torques can be explained as follows:

As a result of cassette and tape width tolerances, tape rolls with individual turns of tape protruding therefrom are usually formed in prior art cassettes. Consequently, the height of the roll is greater than that of the hub, and this results in increased friction between the inner walls of the cassette and the tape roll. As a result of the springy centering action of a liner in a cassette according to the invention, the frictional forces which affect the tape roll are shifted towards the axis of rotation and the total frictional torque of the roll in question is thereby reduced—even if the frictional forces theoretically remained the same.

In FIG. 5d, the liners 20 and 21 possess a bent-up region 33, between their longitudinal central axis 26 and the rear wall of the cassette, the fold being represented as a continuous line 27. Similar regions 33 can be provided on all the lines described and shown in FIGS. 2 to 4. The narrow sides of the liners 20 and 21 can also be provided with such regions, which are inclined towards the central plane of the cassette, the folds being indicated by the broken lines 28a and 28b.

These inclined regions form guide channels at the rear and/or at the sides of the tape roll, which channels effectively prevent the outer turns of tape from slipping off the roll and improve winding and unwinding of the tape. By this means, it is possible to avoid folding-over of the tape, and/or seizing of the tape roll.

The fold 27 should expediently be located in a range defined by half the tape roll radius and the maximum tape roll radius, so that pressure is exerted by these regions of the liner only on the outer turns of tape which are thus guided and supported.

Although the said inclined portions of the liner are known for tape cassettes, the combination of the features of the bearing portions of the liner, which act on the inner periphery of the hub, and of the outer edge portions of the liner which act on the periphery of the tape roll, at least in the region corresponding to the maximum radius of the tape roll, produces surprisingly advantageous effects on the running behavior of the tape rolls. This simple and effective combination of the bearing portions and edge portions of the liner enable both cassette housing and tape width tolerances to be compensated for, and transform the simple compact cassette into a precision cassette for high-quality recordings.

We claim:

1. A tape cassette, especially a magnetic tape cassette, comprising a housing, at least one hub rotatably located within the housing, a roll of tape wound on the said one hub having at least one central recess, at least one aperture in the housing which allows a drive spindle to enter the cassette to drivably engage the said one hub, and at least one liner located between the said one hub and the housing and provided with a hole therein to allow the drive spindle to pass through the said one liner to engage the said one hub, wherein adjacent to the hole in the said one liner, the said one liner is provided with at least one raised bearing portion which projects into the said central recess in the said one hub and thereby resiliently supports the said one hub radially and axially, preventing it from making contact with the region of the housing surrounding the said aperture.

2. A tape cassette, especially a magnetic tape cassette, comprising a housing, at least one hub rotatably mounted on a collar on the housing, a roll of tape wound on the said one hub having at least one central recess, at least one aperture in the housing which allows a drive spindle to enter the cassette to drivably engage the said one hub and which is surrounded by the said collar, and at least one liner located between the said one hub and the housing and provided with a hole therein to allow the drive spindle to pass through the said one liner to engage the said one hub, wherein adjacent to the hole in the said one liner, the said one liner is provided with at least one raised bearing portion which projects into the said central recess in the said one hub and thereby resiliently supports the said one hub radially and axially, preventing it from making contact with the said collar.

3. A cassette as claimed in claim 1 or 2, wherein a plurality of raised bearing portions is provided around the hole in the form of bent-up tabs cut out from the said one liner and arranged symmetrically with respect to the center of the hole.

4. A cassette as claimed in claim 1 or 2, wherein a plurality of raised bearing portions is provided around the hole in the form of embossed projections located adjacent to the edge of the hole in the said one liner.

5. A cassette as claimed in claim 4, wherein the embossed projections are cut open along a radian from the hole center thereby creating flaps.

6. A cassette as claimed in claim 1 or 2, wherein the edge of the hole in the liner defines an annular raised bead.

7. A cassette as claimed in claim 1 or 2, wherein the liner has a low coefficient of friction relative to the hub, at least in the region of the bearing portion.

8. A cassette as claimed in claim 2, wherein the bearing portion bears against the housing collar.

9. A cassette as claimed in claim 1 or 2 having two liners on opposite sides of the hub, wherein the mutually opposite liners each have at least one outer edge portion which is inclined towards the central plane of the cassette, which edge portions bear at least intermittently on the peripheral edge of the tape roll.

* * * * *